United States Patent [19]

Kemmochi

[11] Patent Number: 5,627,919

[45] Date of Patent: May 6, 1997

[54] IMAGE FORMING METHOD AND APPARATUS

[75] Inventor: Kazuhisa Kemmochi, Tokyo, Japan

[73] Assignee: Canon Kabushiki Kaisha, Tokyo, Japan

[21] Appl. No.: 394,199

[22] Filed: Feb. 24, 1995

Related U.S. Application Data

[63] Continuation of Ser. No. 41,259, Apr. 1, 1993, abandoned.

[30] Foreign Application Priority Data

Apr. 3, 1992 [JP] Japan .................................. 4-082190

[51] Int. Cl.$^6$ ...................................... G06K 9/40
[52] U.S. Cl. ............................... 382/254; 358/457
[58] Field of Search .................... 382/237, 254, 382/260; 358/454, 456, 457

[56] References Cited

U.S. PATENT DOCUMENTS

| | | | |
|---|---|---|---|
| 4,698,778 | 10/1987 | Ito et al. | 358/457 |
| 4,814,886 | 3/1989 | Kuge et al. | 358/457 |
| 4,903,123 | 2/1990 | Kawamura et al. | 358/454 |
| 5,124,802 | 6/1992 | Ito et al. | 358/457 |
| 5,148,287 | 9/1992 | Kemmochi et al. | 358/457 |

*Primary Examiner*—Leo Boudreau
*Assistant Examiner*—Chris Kelley
*Attorney, Agent, or Firm*—Fitzpatrick, Cella, Harper & Scinto

[57] ABSTRACT

An image forming apparatus includes an input unit for inputting image data and a converter for converting the input image data into dot information. An image forming circuit controls a scan optical system on the basis of the dot information to form an image. The converter converts the image data into dot information having a screen angle by repeatedly using a predetermined threshold matrix so that the dot information appears preferentially in a sub-scan direction, perpendicular to the main-scan direction of the scan optical system. In the threshold matrix, threshold values are arranged so that their levels increase preferentially in the sub-scan direction.

18 Claims, 11 Drawing Sheets

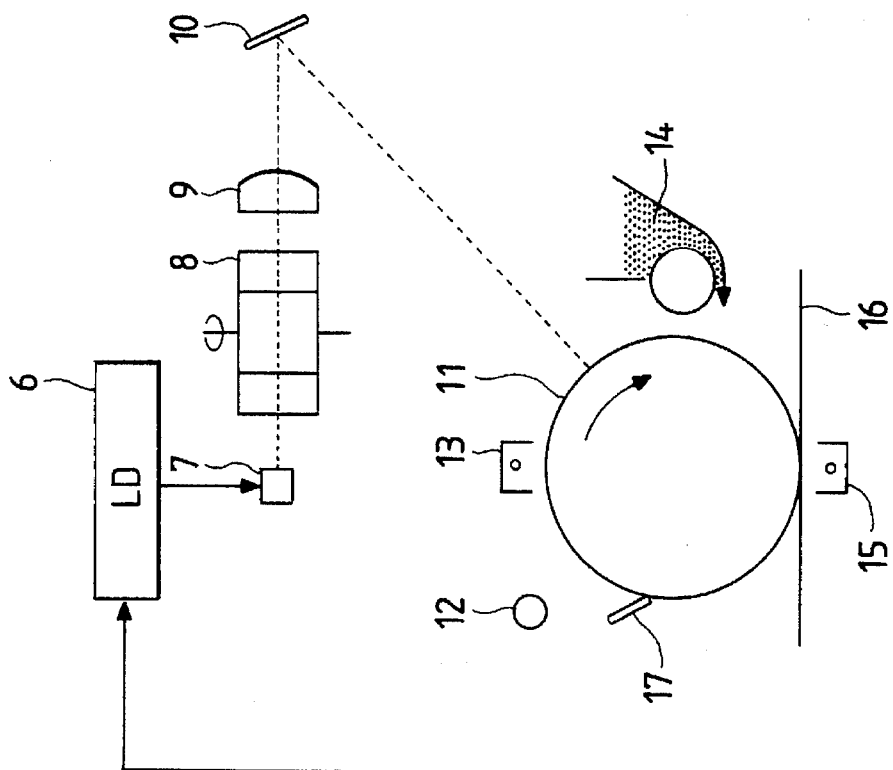
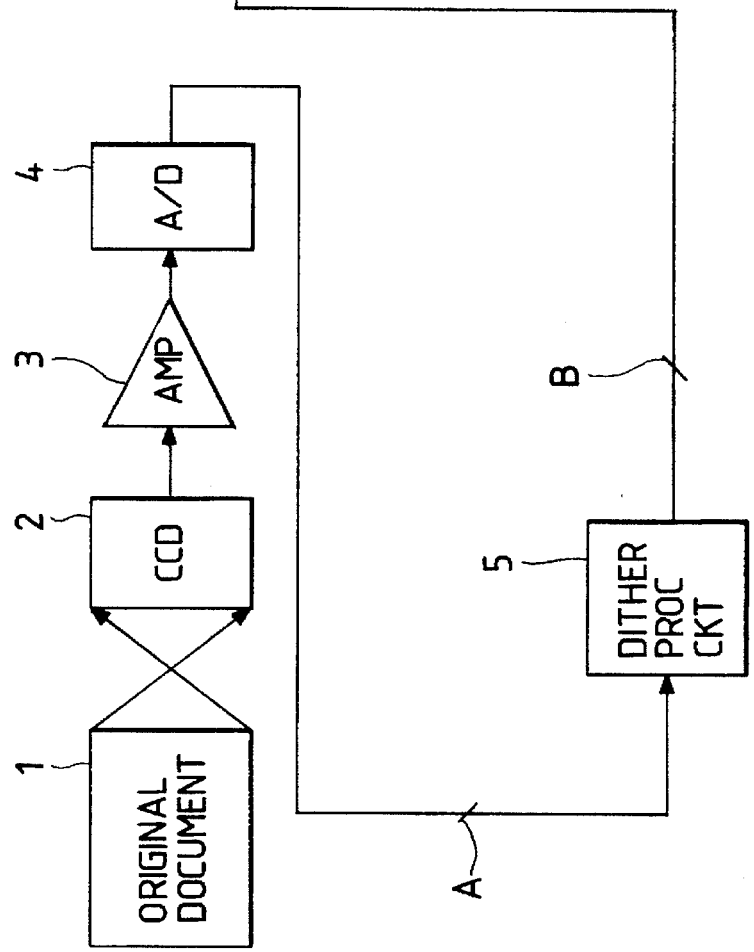
FIG. 2

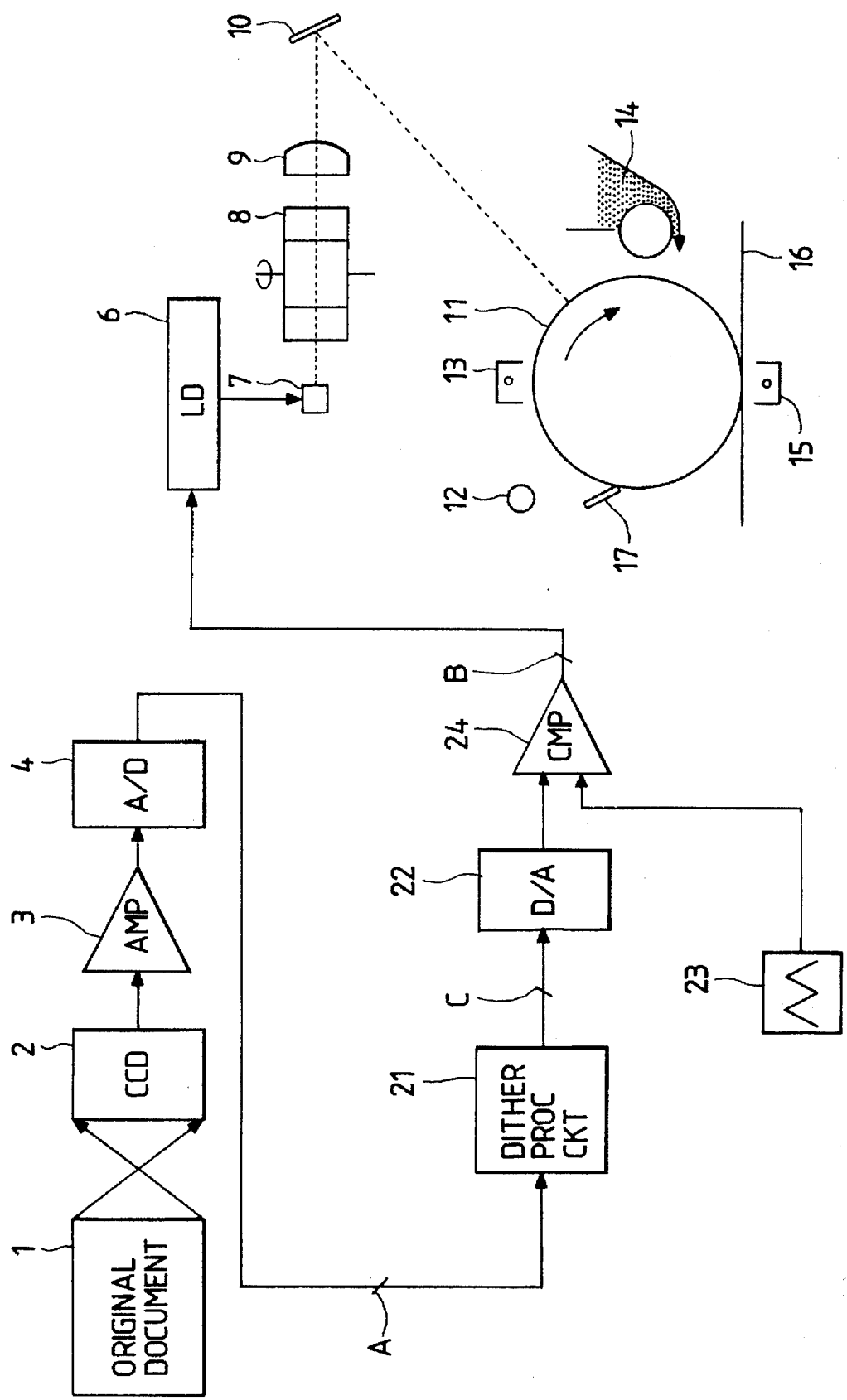

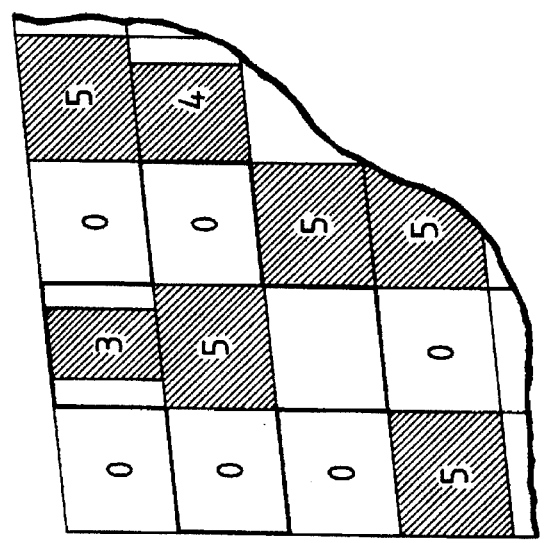
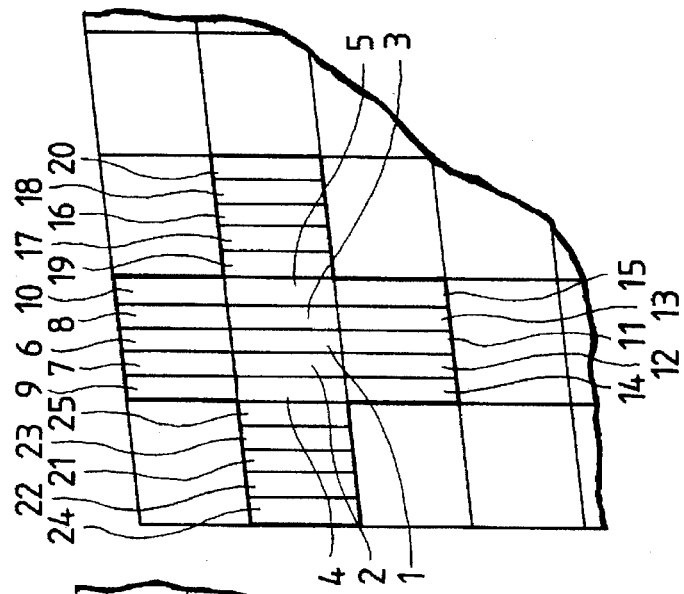
FIG. 8C   FIG. 8B   FIG. 8A

FIG. 10

| 12 | 2 | 5 | | | |
|----|---|---|---|---|---|
| 11 | 1 | 4 | 7 | 9 | 14 |
| 13 | 3 | 6 | 8 | 10 | 15 |

| | | | | | 14 | 8 | 2 | 5 | 11 | | | | | |
|---|---|---|---|---|---|---|---|---|---|---|---|---|---|---|

$M_{i, j-1}$   $M_{i, j}$   $M_{i, j+1}$

| 25 | 21 | 17 | 19 | 23 | 13 | 7 | 1 | 4 | 10 | 24 | 20 | 16 | 18 | 22 |
|----|----|----|----|----|----|---|---|---|----|----|----|----|----|----|

| | | | | | 15 | 9 | 3 | 6 | 12 | | | | | |
|---|---|---|---|---|---|---|---|---|---|---|---|---|---|---|

$M_{i+1, j}$

IMAGE FORMING METHOD AND APPARATUS

This application is a continuation of application Ser. No. 08/041,259 filed Apr. 1, 1993, now abandoned.

BACKGROUND OF THE INVENTION

1. Field of the Invention

The present invention relates to an image forming method and apparatus to form an image by using a scan optical system and, more particularly, to an image forming method and apparatus for converting input image data into dot information by using a predetermined threshold matrix, for controlling the scan optical system on the basis of dot information, and for forming an image.

2. Related Background Art

Hitherto, a method of expressing a half tone, a dither method, a density pattern method, or the like are known. According to those methods, an image having a screen angle can easily be formed due to a method of setting a threshold matrix. Further, in the reproduction of a color image which is formed by overlaying multicolor inks or multicolor toners, the above method is particularly useful to eliminate a moire fringe of the color and to obtain uniformity of an average color irrespective of a resist aberration or the like.

In addition to the above method, the applicant of the present invention has already proposed a method of improving a gradation while keeping a high resolution by a relatively simple construction of an apparatus. Such a method is called a PWM method and its principle and operation is shown in FIG. 12. In FIG. 12, an input digital image signal is converted into an analog image signal. By comparing the analog image signal with a periodic pattern signal such as a triangular wave signal, a pulse width modulated (PWM) binary signal is generated and the binary signal is used as a drive signal of a laser light source a laser printer.

On the other hand, there is a method intermediate the dither method and the density pattern method, wherein one pixel of a dither matrix is further finely divided and is converted into multi-values for each pixel by using a density pattern (hereinafter, referred to as a multi-value dither method).

The PWM method is applied to the multi-value conversion of each pixel, so that both a high resolution and a high gradation can be accomplished.

However, in the case where the well-known conventional processing method is applied to an image forming apparatus using the scan optical system (for example, a laser printer which forms an image by scanning a laser by using a polygon mirror), there is a drawback such that an image deterioration such as a pitch variation or the like occurs. In the conventional construction, therefore, particularly, in the case where an image having a screen angle was formed, a writing position is periodically deviated in each of the main-scan and sub-scan directions every scan line. As shown in FIG. 13, consequently, there is a drawback such that dots are connected (overlapped) and oblique lines are generated in, particularly, the highlight portion and the half-tone portion.

Such a drawback occurs due to the following reason. Namely, since the scan beam forming each dot has light amount distributions for the main scan and sub scan as shown in FIGS. 14A and 14B, when the beam is scanned to a position which is deviated from the position at which a dot should inherently be formed, the positions of the dots which should inherently be arranged at almost equal intervals as those of the peripheral pixels are deviated and, as shown in FIG. 15, an uneven interference occurs among the respective dots, so that such oblique lines are generated (consequently, as the resolution rises, such a drawback increases).

Such a problem is common to all image forming apparatuses, each of which forms an image having a screen angle by using the above scan optical system.

SUMMARY OF THE INVENTION

It is an object of the present invention to provide an image forming method and apparatus in which a scan optical system is controlled and an image is formed, an inconvenience such that dots are combined by a scan variation and oblique lines are generated can be prevented and an image of a high quality can be formed.

Another object of the invention is to provide an image forming method and apparatus in which image data is converted into dot information by using a threshold matrix such that the growth of dots preferentially appears in the direction perpendicular to the scan direction of a scan optical system, so that an image of a high quality, which can prevent an influence by a pitch variation, can be formed by a simple construction.

Still another object of the invention is to provide an image processing method and apparatus in which an influence by a pitch variation of the scan optical system can be reduced by image processes.

The above and other objects and features of the present invention will become apparent from the following detailed description and the appended claims with reference to the accompanying drawings.

BRIEF DESCRIPTION OF THE DRAWINGS

FIG. 2 is a block diagram of an apparatus according to the first embodiment of the invention;

FIGS. 4A to 4C are diagrams for explaining flows of dither processes based on a binary dither method of the first embodiment;

FIG. 6 is a block diagram of an apparatus according to the second embodiment;

FIGS. 8A to 8C are diagrams for explaining flows of dither processes based on a multi-value dither method according to the second embodiment;

FIG. 10 is a diagram showing an example of another fatting pattern in a multi-value dither method;

FIG. 11 is a diagram showing an example of another fatting pattern in the multi-value dither method;

DETAILED DESCRIPTION OF THE PREFERRED EMBODIMENTS

Figure 1A:
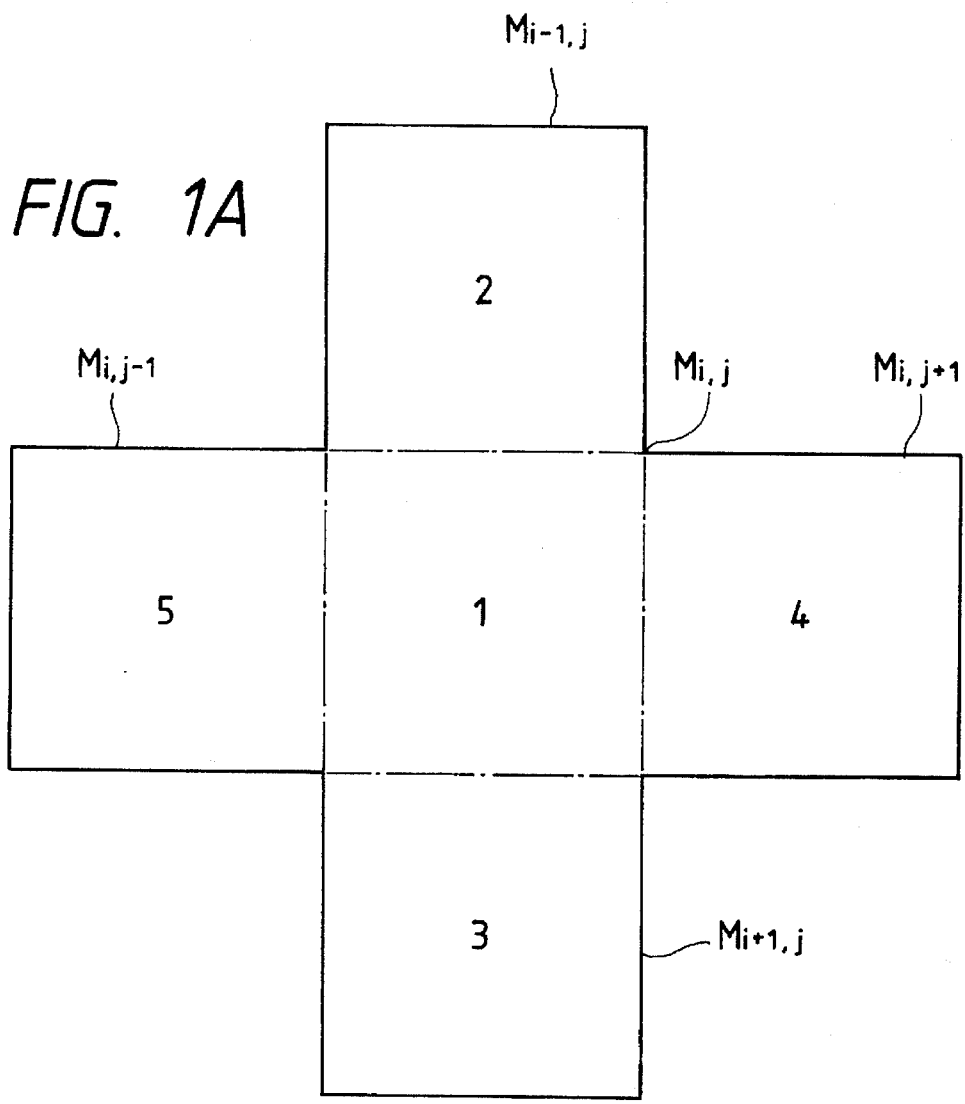
FIGS. 1A and 1B are diagrams showing fatting patterns of dots in a binary dither method according to an embodiment of the present invention.

An embodiment of the present invention will now be described as an example with respect to a laser beam printer for forming an image by controlling a scan optical system. An example of converting input image data into binary dot information by a dither method will be first described as a first embodiment.

FIG. 2 is a block diagram of an image forming apparatus of the embodiment according to the present invention. In the diagram, the image signal which is obtained by reading an image of an original document 1 by a CCD 2 is amplified by an amplifier (AMP) 3 and is converted into a digital image signal A consisting of a plurality of bits by an A/D converter (A/D) 4.

The digital image signal A is converted to a binary signal B (dot information) of one bit which has been subjected to a binary dither process by a dither processing circuit 5.

The binary signal B is directly supplied to a laser driving circuit 6 and is used as an ON/OFF control signal of the light emission of a laser diode 7.

A laser beam emitted from the laser diode 7 is scanned in the main-scan direction by a well-known polygon mirror 8 and passes through an f/θ lens 9 and is reflected by a reflecting mirror 10. The reflected laser beam is irradiated onto the surface of a photosensitive drum 11 which is rotating in the direction shown by an arrow in FIG. 2, thereby forming an electrostatic latent image. In the embodiment, an OPC photosensitive drum whose potential is stable for an aging change is used as a photosensitive drum 11. After the drum 11 is uniformly subjected to a discharging process by an exposing unit 12, the surface of the drum 11 is uniformly charged to a negative potential by a charging unit 13. After that, the foregoing laser beam is irradiated to the drum 11, so that an electrostatic latent image according to the binary image signal is formed on the surface of the drum. In the embodiment, what is called an image scan method such that the portion (black pixel portion) to be developed is exposed is used. Therefore, in a developing unit 14, by a well-known inversion developing method, the toner having minus charging characteristics is deposited to the portion of the drum 11 which has been discharged by the laser and the toner image on the drum is developed. The developed image (toner image having minus charges) formed on the drum 11 is copy transferred onto a copy transfer material (paper is generally used) 16 by a plus corona charging process by a copy transfer charging unit 15. To raise a copy transfer efficiency, the residual toner remaining on the photosensitive drum 11 without partially being copy transferred is scraped off by a cleaner 17 after that. The series of processes mentioned above are again repeated.

Figure 3:
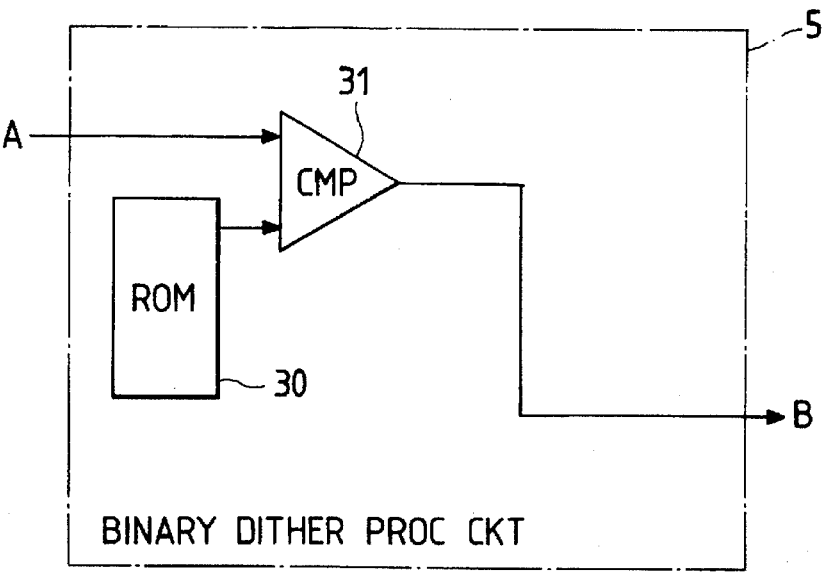
FIG. 3 is a block diagram of a dither processing circuit in the first embodiment of the invention.

FIG. 3 is a block diagram of the dither processing circuit 5 in the embodiment. In the diagram, reference numeral 30 denotes a ROM in which elements of a dither threshold matrix based on the binary dither method have been stored. Reference numeral 31 denotes a comparator (CMP) for comparing the input digital image signal and each dither threshold matrix element from the ROM 30 and for generating a logic 1 level as a binary signal B for every element which satisfies the following relation: (digital image signal A)≧(dither threshold matrix element).

FIG. 1A is a diagram showing a dither threshold matrix of the embodiment. As shown in the diagram, the dither threshold matrix of the embodiment comprises a total of five pixels: $(M_{i-1,j})$, $(M_{i,j-1})$, $(M_{i,j})$, $(M_{i,j+1})$, and $(M_{i+1,j})$. Threshold values (1 to 5) of five stages are allocated so as to give a preference to the dot growth in the sub-scan direction (vertical direction which perpendicularly crosses the scan direction of the laser, namely, the rotating direction of the drum) than the dot growth in the main-scan direction (scan direction of the laser). That is, subsequent to $M_{i,j}$ to which the minimum threshold value is allocated, the threshold values sequentially increase in accordance with the order of $M_{i-1,j} \rightarrow M_{i+1,j}$. When such a dither matrix is compared with the input digital image signal A, the binary signal B of 0 (white level) or 1 (black level) preferentially grows in the sub-scan direction and is output for each pixel.

Figure 1B:
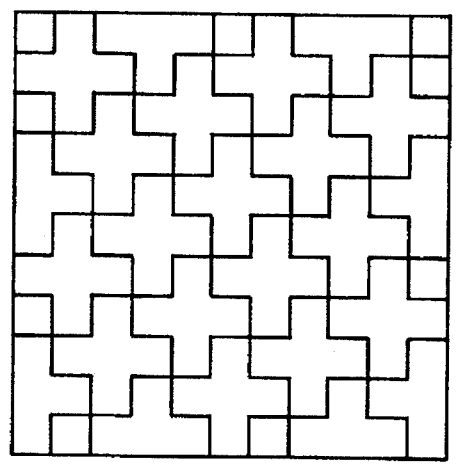

FIG. 1B is a diagram showing a state in the case where the dither threshold matrix is repetitively applied to the input image plane. Due to this, at least the dither threshold matrix of one unit as shown in FIG. 1A has been stored in the ROM 30 of the embodiment which can give a screen angle to an output image. Or, as shown in FIG. 1B, a plurality of dither threshold matrices can be also stored so as to obtain a rectangular periphery. With this method, a control for dither processes by the ROM 30 becomes easy.

Figures 4A, 4B, 4C:
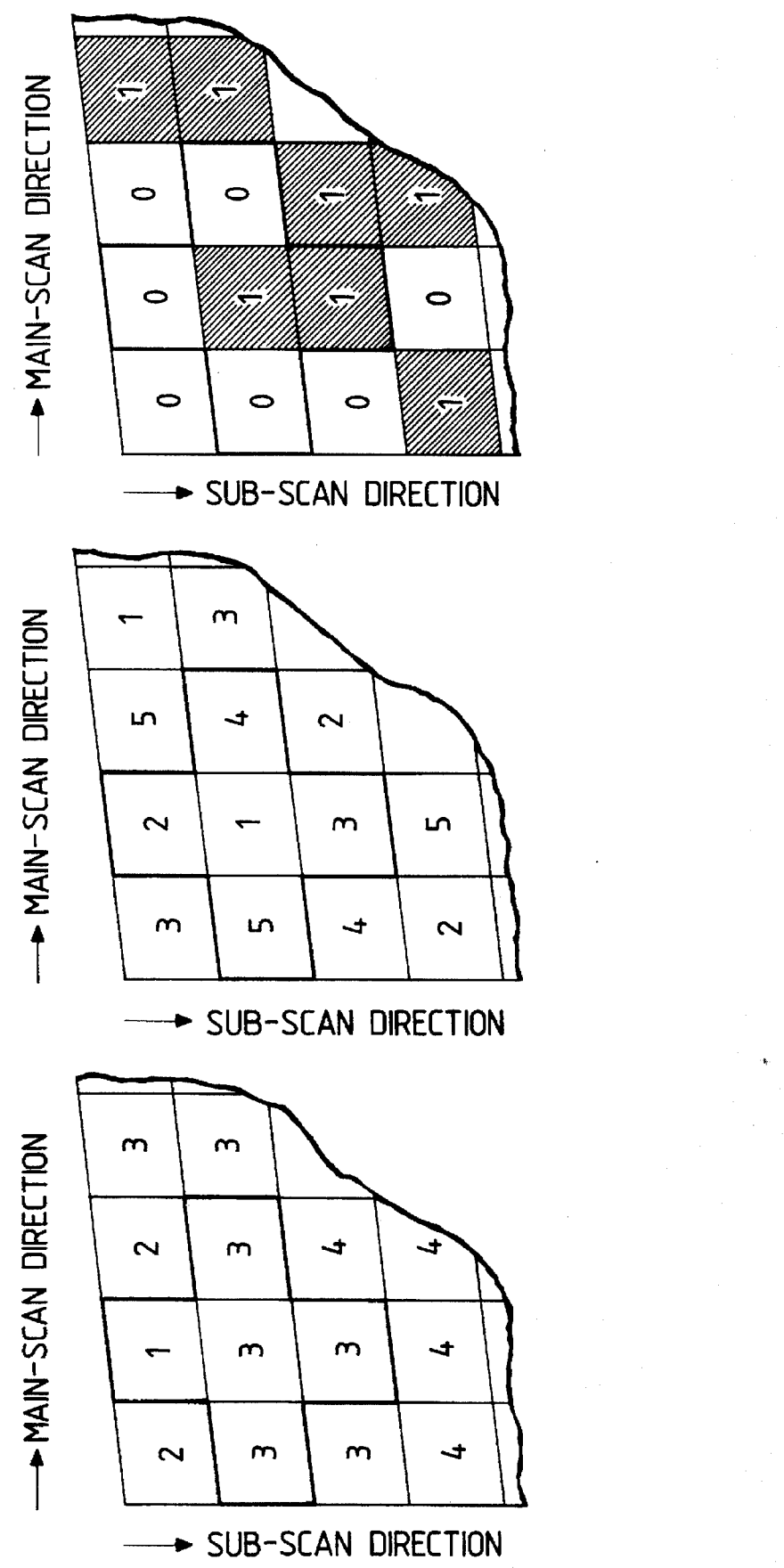

FIGS. 4A and 4B are diagrams for explaining flows of the dither processes based on the binary dither method of the embodiment. In FIG. 4A, as for the input digital image signal A, five pixels are made to correspond to the dither processes by the ROM 30 at a certain time point as shown in the diagram. In FIG. 4B, the dither threshold matrices which are read out from the ROM 30 are as shown in the diagram. The comparator 31 compares each pixel of the digital image signal A and each of five elements of the dither threshold matrix corresponding to such a pixel. In FIG. 4C, a dot arrangement which satisfies the logical 1 level of the result of the comparison is as shown in the diagram. Therefore, in order to express the gradation while five pixels of the binary output is set to one unit, the image signal is output as a dot having the gradation information of a total of six stages.

In the example, the expression of a total of six gradations can be realized by the dither threshold matrix of a total of five pixels which can output one gradation per one pixel. Therefore, the input digital image signal is also set to a multi-value signal of six stages of 0 (white level) to 5 (black level).

As will be obviously understood from FIG. 4C, in the case where the data of FIG. 4A was binarized by the threshold matrix of FIG. 4B, the dots preferentially grow in the sub-scan direction (direction perpendicular to the scan direction of the laser).

Figure 16:
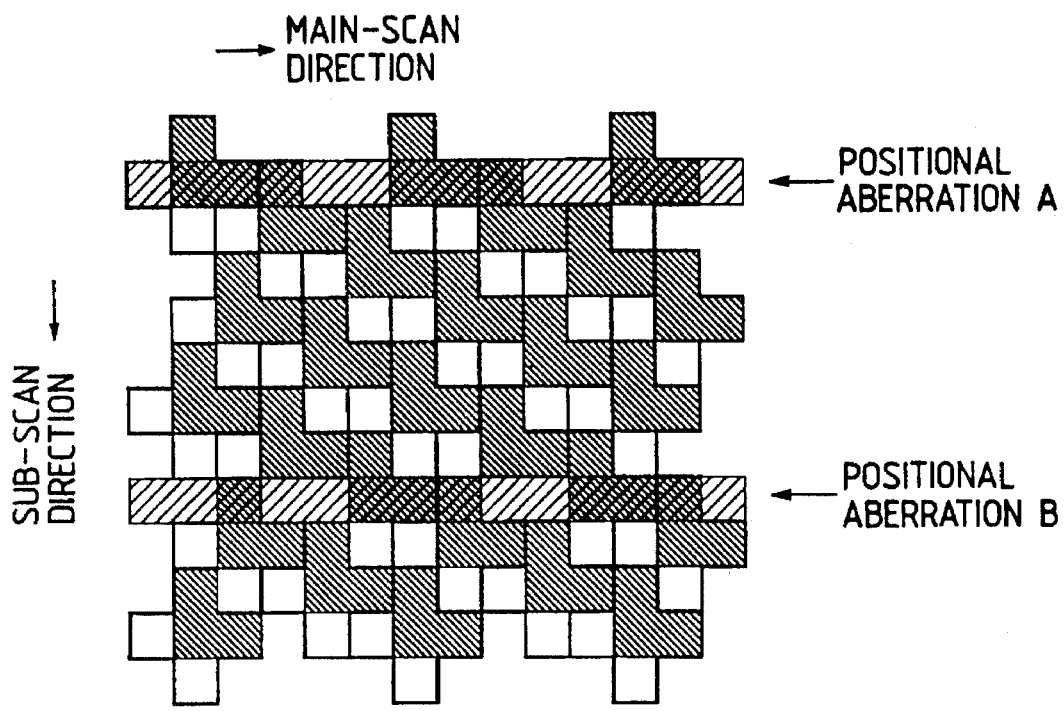
FIG. 16 is a diagram showing an influence by a scan variation in case of a conventional fatting pattern.
Figure 17:
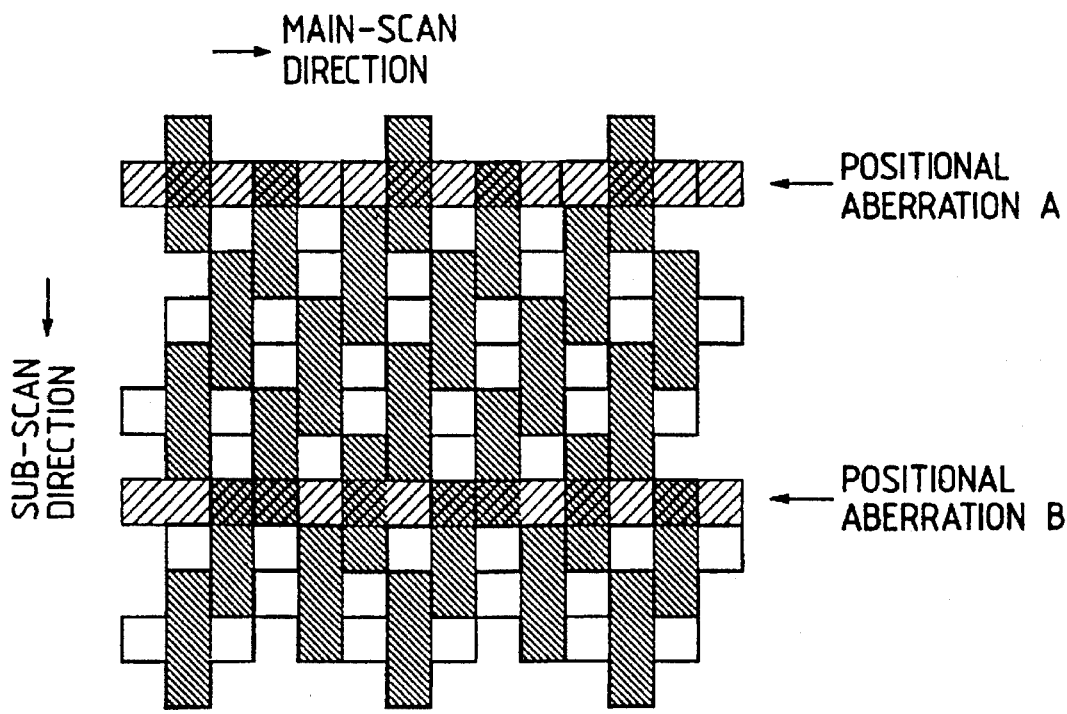
FIG. 17 is a diagram showing an influence by a scan variation in case of a fatting pattern of the embodiment.

FIG. 16 shows an example in the case where data was binarized by using a conventional fatting dither pattern such that the dots are uniformly grown in the main-scan and sub-scan directions. FIG. 17 is a diagram showing an example in the case where data was binarized by using a dither pattern such that the dots are preferentially grown in the sub-scan direction which has already been described in the embodiment. FIGS. 16 and 17 show states of latent images formed on the drum by controlling the laser on the basis of the result of binarization. In the diagrams, scan deviation occurs at the positions of the positional aberrations A and B.

As for the latent image which is formed by the conventional fatting dither pattern of FIG. 16, three dots are continuously generated in the main-scan direction in each of the positional aberrations A and B. Namely, since the pixels which cause the positional aberration are generated in a lump, they result in an oblique line in the case of forming an image with a screen angle.

On the other hand, in the case of the latent image formed by the dither pattern such that the dots are preferentially grown in the sub-scan direction as shown in FIG. 17, only one dot is generated in the positional aberration A and only one or two dots are continuously generated in the positional aberration B. Namely, since the dots which cause an aberration are distributed and formed, even if an image is formed with a screen angle, the image of a high quality such that the oblique line is inconspicuous can be obtained.

As mentioned above, since the dot growth in the sub-scan direction is preferentially executed as compared with the main-scan direction, even if a periodic scan variation of the optical system occurs, the writing aberration can be uniformly distributed to each dot, so that the image having a screen angle without an image variation such as an oblique line or the like can be obtained.

Figure 9:
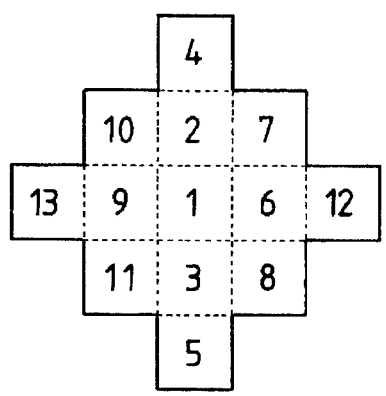
FIG. 9 is a diagram showing an example of another fatting pattern in the binary dither method.
Figure 12:
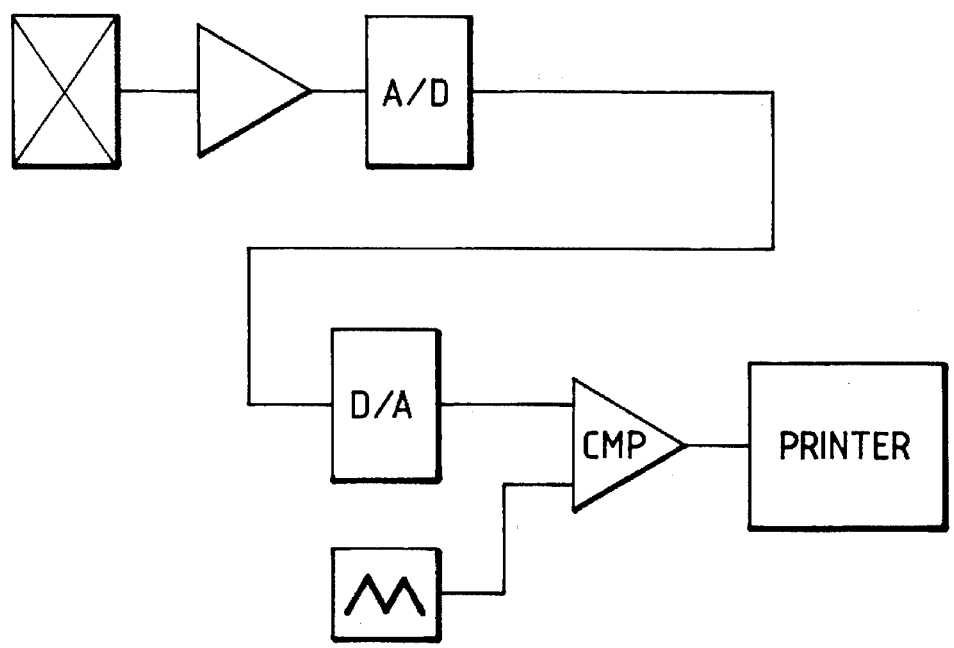
FIG. 12 is a diagram for explaining a PWM method.
Figure 13:
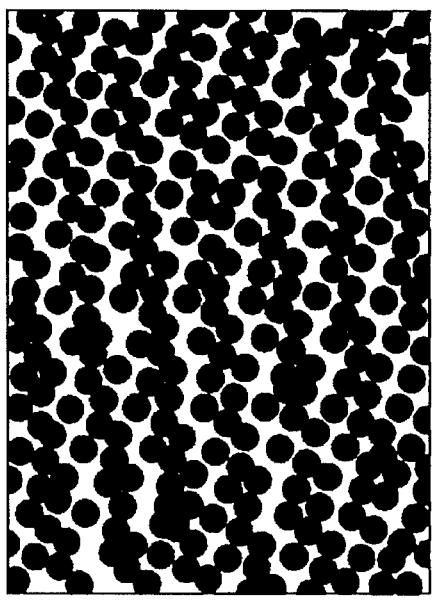
FIG. 13 is a diagram showing an example of an output pattern in which an image having a screen angle was formed by a conventional method by using a laser beam printer.
Figure 14A:
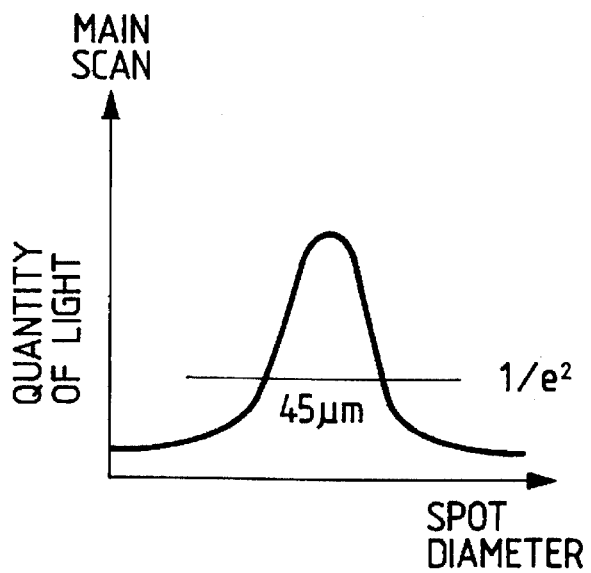
FIGS. 14A and 14B are diagrams showing light amount distributions of a laser beam.
Figure 14B:
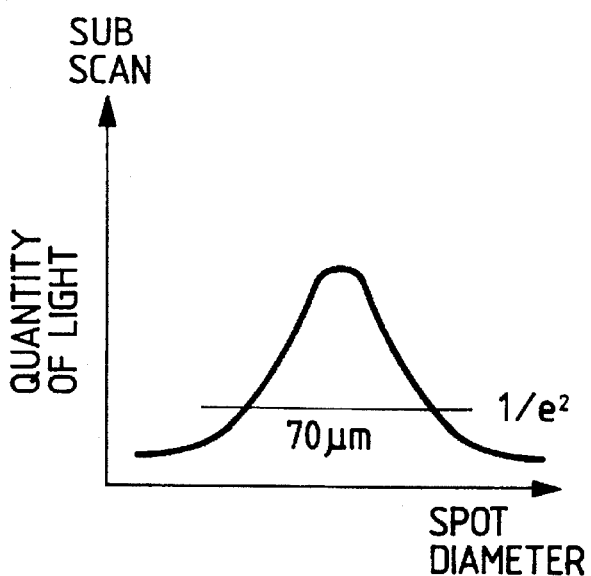
Figure 15:
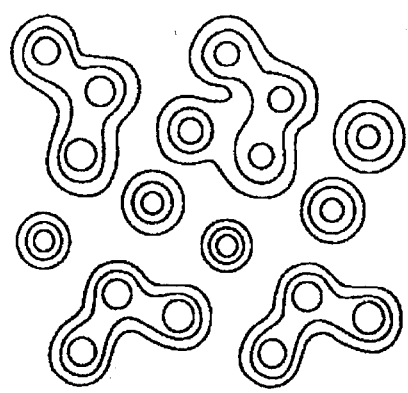
FIG. 15 is a diagram showing an exposure distribution on a photosensitive drum according to a conventional method.

Although the embodiment uses the threshold matrix shown in FIG. 1, the invention is not limited to such a matrix. For instance, a threshold matrix as shown in FIG. 9 may be used, when the threshold matrix is set so as to preferentially grow in the sub-scan direction, the effect of the invention can be obtained.

When the input image is a color image, the dither process is executed to each of the input image data of the four colors of Y, M, C, and K. In this case, the dither patterns which are used for the respective input data have different shapes so as to form a different screen angle for each color. Dither values of the dither patterns are arranged so as to preferentially grow the dots in the sub-scan direction. Due to this, a different screen angle can be formed for each color. Thus, the generation of a color moire can be prevented. Further, the generation of the oblique line due to a pitch variation for each color can be prevented. Thus, a color image of a high picture quality can be obtained.

Although the first embodiment has been shown and described with respect to the example of the image formation by the binary dither method, the second embodiment will now be described hereinbelow with respect to an example in which the present invention is applied to the multi-value dither method in which information of one pixel is set to a multi-value output.

FIG. 6 is a block diagram of an image forming apparatus of the second embodiment according to the invention.

In the diagram, reference numeral 21 denotes a multi-value dither processing circuit; 22 a D/A converter; 23 a triangular wave generator; and 24 a comparator. The other component elements having the same functions as those shown in the first embodiment are designated by the same reference numerals and their descriptions are omitted.

The operation of the component elements 21 to 24 will now be described hereinbelow.

Figure 7:
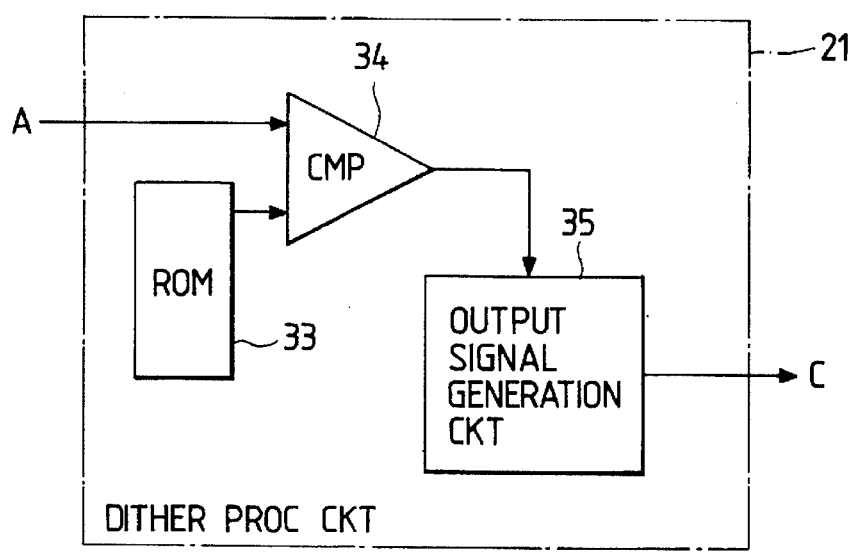
FIG. 7 is a block diagram of a dither processing circuit in the second embodiment.

FIG. 7 is a block diagram of the dither processing circuit 21 according to the second embodiment. In the diagram, reference numeral 33 denotes a ROM in which elements of a dither threshold matrix based on the multi-value dither method have been stored. Reference numeral 34 indicates a comparator (CMP) for comparing the input digital image signal A and each dither threshold matrix element which is read out from the ROM 33 and for generating a logical 1 level for each pixel which satisfies the following relation: (digital image signal A)≧(dither threshold matrix element). Reference numeral 35 denotes an output signal generation circuit for generating signals (digital image signal C) of the number equal to the number of elements which satisfy the logical 1 level as a result of dither processes with respect to each pixel of the input digital image signal A.

Figure 5:
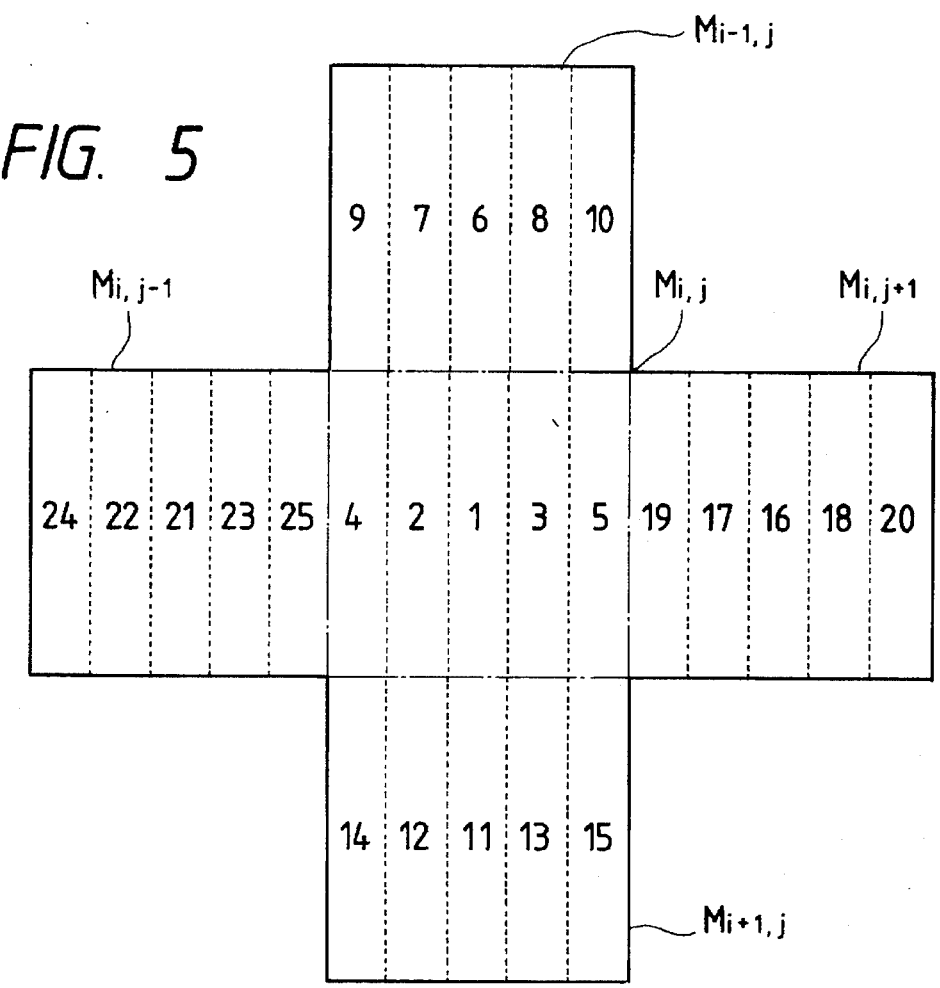
FIG. 5 is a diagram showing a fatting pattern of dots according to the second embodiment.

FIG. 5 is a diagram showing the dither threshold matrix in the second embodiment. As shown in the diagram, the dither threshold matrix of the embodiment comprises total five pixels of $(M_{i-1,j})$, $(M_{i,j-1})$, $(M_{i,j})$, $(M_{i,j+1})$, and $(M_{i+1,j})$. Each pixel is further divided into five equal parts, so that threshold values (1 to 25) of total 25 stages are allocated preferentially in the sub-scan direction (vertical direction in the diagram). Namely, the total number of threshold values of $M_{i,j}$ is equal to 15. The total number of threshold values of $M_{i-1,j}$ is equal to 40. The total number of threshold values of $M_{i+1,j}$ is equal to 65. The total number of threshold values of $M_{i,j+1}$ is equal to 90. The total number of threshold values of $M_{i,j-1}$ is equal to 115. Therefore, the threshold values sequentially increase in accordance with the order of $M_{i,j} \rightarrow M_{i-1,j} \rightarrow M_{i+1,j} \rightarrow M_{i,j+1} \rightarrow M_{i,j-1}$. The threshold values are allocated preferentially in the sub-scan direction. Consequently, when such a dither threshold value is compared with the input digital image signal A, multi-value dots of six stages of 0 (white level) to 5 (black level) are outputted every pixel.

In the embodiment, by repeatedly using the matrix of FIG. 5 as shown in FIG. 1B, a screen angle can be given to the image.

FIGS. 8A to 8C are diagrams for explaining flows for dither processes based on the multi-value dither method of the second embodiment. In FIG. 8A, as for the input digital image signal A, five pixels are made to correspond to the dither processes by the ROM 33 at a certain time point as shown in the diagram. In FIG. 8B, the dither threshold matrix which is read out from the ROM 33 is as shown in the diagram. The comparator 34 compares each pixel of the digital image signal A and each of five elements of the dither threshold matrix corresponding thereto. In FIG. 8C, the dot arrangement which satisfy the logical 1 level as a result of comparison is as shown in the diagram. Therefore, the digital image signal C which is generated from the output signal generation circuit 35 is output as a signal having gradation information for a total of six stages of 0 (white level) to 5 (black level) for each pixel.

In the second embodiment, the expression of a total of 26 gradations can be accomplished by the dither threshold matrix of a total of five pixels which can generate six gradations per one pixel. Therefore, the input digital image signal is also set to the multi-value signal of 26 stages of 0 (white level) to 25 (black level).

Further, the digital image signal C is converted into the analog signal by the D/A converter (D/A) 22. The analog signal is compared by the comparator (CMP) 24 with the triangular wave signal generated from the triangular wave generation circuit 23, so that the binary signal B in which the pixel density has been pulse width modulated is output. The binary signal B is directly supplied to the laser driving circuit 6 and is used as an ON/OFF control signal of the light emission of the laser diode 7.

As mentioned above, since the dots are preferentially grown in the sub-scan direction in a manner similar to the first embodiment, even in the case of using the multi-value dither method, even when a periodical scan variation of the optical system occurs, an image of a high quality having a screen angle which has multi-gradations per pixel can be obtained without an image variation such as an oblique line or the like.

Although the second embodiment uses the threshold matrix as shown in FIG. 5, the invention is not limited to such a matrix. For instance, a threshold matrix as shown in FIG. 10 may be used, when the threshold matrix is set so as to preferentially grow the dots in the sub-scan direction, wherein the effect of the invention can be obtained.

In the second embodiment, to stably reproduce the dots, the fatting pattern (FIG. 5) is used such that the dots grow every pixel. However, so long as the printer can stably reproduce the minimum pixel, as shown in FIG. 11, by using a fatting pattern such that the dots grow in the sub-scan direction so as to be formed in a plurality of pixels, the effect of the invention is further improved.

Although the second embodiment has been described with respect to the processes for one input data, by executing the same processes to images of a plurality of colors such as (R, G, B) or (Y, M, C, K) in a manner similar to the first embodiment, a full color image of a high quality can be also formed.

As described above, according to the present invention, when the scan optical system is controlled and an image is formed, by preferentially growing the dots in the sub-scan direction than the main-scan direction, an image of a high quality without an image variation such as an oblique line or the like can be formed.

Although the present invention has been described with respect to the preferred embodiments, the invention is not limited to those embodiments but many modifications and variations are possible within the spirit and scope of the appended claims of the invention.

What is claimed is:

1. An image forming apparatus comprising:
   input means for inputting image data;
   converting means for converting the input image data into dot information in a unit of a block consisting of plural pixels respectively in a main-scan direction and a sub-scan direction; and
   image forming means for forming an image on the basis of the dot information from said converting means,
   wherein said converting means converts the input image data of one pixel into multi-level dot information,
   as a level of the input image data increases, said converting means grows a dot, within one pixel, from a pixel center alternatively in the main-scan direction and an inverse main-scan direction, and
   after growth of the dot within one pixel is completed, said converting means grows the dot information of the pixel in the sub-scan direction prior to an adjacent pixel in the main-scan direction.

2. An apparatus according to claim 1, wherein said converting means converts the input image data into the dot information by using a predetermined threshold matrix.

3. An apparatus according to claim 2, wherein said threshold matrix has a predetermined shape and said converting means outputs the dot information having a screen by repeatedly using said threshold matrix.

4. An apparatus according to claim 1, wherein said image forming means comprises:
   scanning means for scanning a laser beam on the basis of the dot information;
   a photosensitive drum which receives said laser beam; and
   means for developing a latent image on said photosensitive drum and for copy transferring the developed image onto a recording medium.

5. An apparatus according to claim 2, wherein said converting means compares the inputted image data of one pixel and one threshold value in said threshold matrix and converts the image data of one pixel into binary dot information.

6. An apparatus according to claim 2, wherein said converting means compares the inputted image data of one pixel and a plurality of threshold values in said threshold matrix and converts the image data of one pixel into multi-value dot information.

7. An apparatus according to claim 2, wherein in the threshold matrix which is used by said converting means, threshold values are arranged so that the levels of the threshold values increase preferentially in the direction perpendicular to the scan direction of the scan optical system.

8. An image processing method comprising the steps of:
   inputting image data;
   converting the input image data into dot information in a unit of a block consisting of plural pixels respectively in a main-scan direction and a sub-scan direction; and
   outputting the dot information to an image forming apparatus,
   wherein, in said converting step, the input image data of one pixel is converted into multi-level dot information,
   in said converting step, as a level of the input image data increases, within one pixel, a dot is grown from a pixel center alternately in the main-scan direction and an inverse main-scan direction, and
   after growth of the dot within one pixel is completed, the dot information of the pixel is grown in the sub-scan direction prior to an adjacent pixel in the main-scan direction.

9. A method according to claim 8, wherein in said converting step, the inputted image data is converted into the dot information by using a predetermined threshold matrix.

10. A method according to claim 9, wherein said threshold matrix has a predetermined shape, and in said converting step, dot information having a screen is outputted by repeatedly using said threshold matrix.

11. A method according to claim 8, wherein the image forming apparatus having the scan optical system is a laser beam printer to form an image by an electrophotographic method by using a laser beam.

12. A method according to claim 9, wherein in said converting step, the inputted image data of one pixel is compared with one threshold value in said threshold matrix and the image data of one pixel is converted into binary dot information.

13. A method according to claim 9, wherein in said converting step, the inputted image data of one pixel is compared with a plurality of threshold values in said threshold matrix and the image data of one pixel is converted into multi-value dot information.

14. A method according to claim 9, wherein in the threshold matrix which is used in said converting step, threshold values are arranged so that the levels of the threshold values increase preferentially in the direction perpendicular to the scan direction of the scan optical system.

15. An image forming apparatus comprising:

a threshold matrix having plural blocks respectively in a main-scan direction and a sub-scan direction, and having plural threshold values in a single block;

input means for inputting image data;

converting means for converting the input image data into dot information by using said threshold matrix; and image forming means for forming an image on the basis of the dot information from said converting means, wherein said converting means compares an input image data of one pixel with the plural threshold values within the single block of said threshold matrix, converts a compared result into multi-level dot information, and as a level of the input image data increases, said converting means grows the multi-level dot information from a center alternately in the main-scan direction and inverse main-scan direction within the single block, and after a growth of the multi-level dot information within the single block is completed, said converting means grows the multi-level dot information of the block in the sub-scan direction prior to an adjacent block in the main-scan direction.

16. An image processing method comprising the steps of:

providing a threshold matrix having plural blocks respectively in a main-scan direction and a sub-scan direction, and having plural threshold values in a single block;

inputting image data;

converting the input image data into dot information by using the threshold matrix; and outputting the dot information to an image forming apparatus, wherein, in said converting step, an input image data of one pixel is compared with the plural threshold values within the single block of the threshold matrix and a compared result is converted into multi-level dot information, and in said converting step, as a level of the input image data increases, the multi-level information is grown from a center alternatively in the main-scan direction and inverse main-scan direction within the single block, and after a growth of the multi-level dot information within the single block is completed, the multi-level dot information of the block is grown in the sub-scan direction prior to an adjacent block in the main-scan direction.

17. An apparatus according to claim 15, wherein the threshold values of said threshold matrix are arranged such that a total value of the threshold values within the single block becomes larger preferentially in the sub-scan direction.

18. A method according to claim 16, wherein the threshold values of the threshold matrix are arranged such that a total value of the threshold values becomes greater preferentially in the sub-scan direction.

* * * * *

UNITED STATES PATENT AND TRADEMARK OFFICE
CERTIFICATE OF CORRECTION

PATENT NO. : 5,627,919

DATED : May 6, 1997

INVENTOR : KAZUHISA KEMMOCHI

Page 1 of 2

It is certified that error appears in the above-identified patent and that said Letters Patent is hereby corrected as shown below:

Column 1

Line 37, "source" should read --source of--;
   Line 64, "sub scan" should read --sub-scan--.

Column 3

Line 60, "cleaner 17 after that. The" should read
         --cleaner 17. After that, the--.

Column 6

Line 13, "total" should read --a total of--;
   Line 16, "total" should read --a total of--;

UNITED STATES PATENT AND TRADEMARK OFFICE
CERTIFICATE OF CORRECTION

PATENT NO.  : 5,627,919

DATED       : May 6, 1997

INVENTOR    : KAZUHISA KEMMOCHI

It is certified that error appears in the above-identified patent and that said Letters Patent is hereby corrected as shown below:

Column 6 continued

Line 30, "outputted," should read --output--;
   Line 44, "satisfy" should read --satisfies--.

Column 10

Line 11, "alternatively" should read --alternately--.

Signed and Sealed this

Fourteenth Day of October, 1997

*Attest:*

BRUCE LEHMAN

*Attesting Officer*     *Commissioner of Patents and Trademarks*